(No Model.) 2 Sheets—Sheet 2.

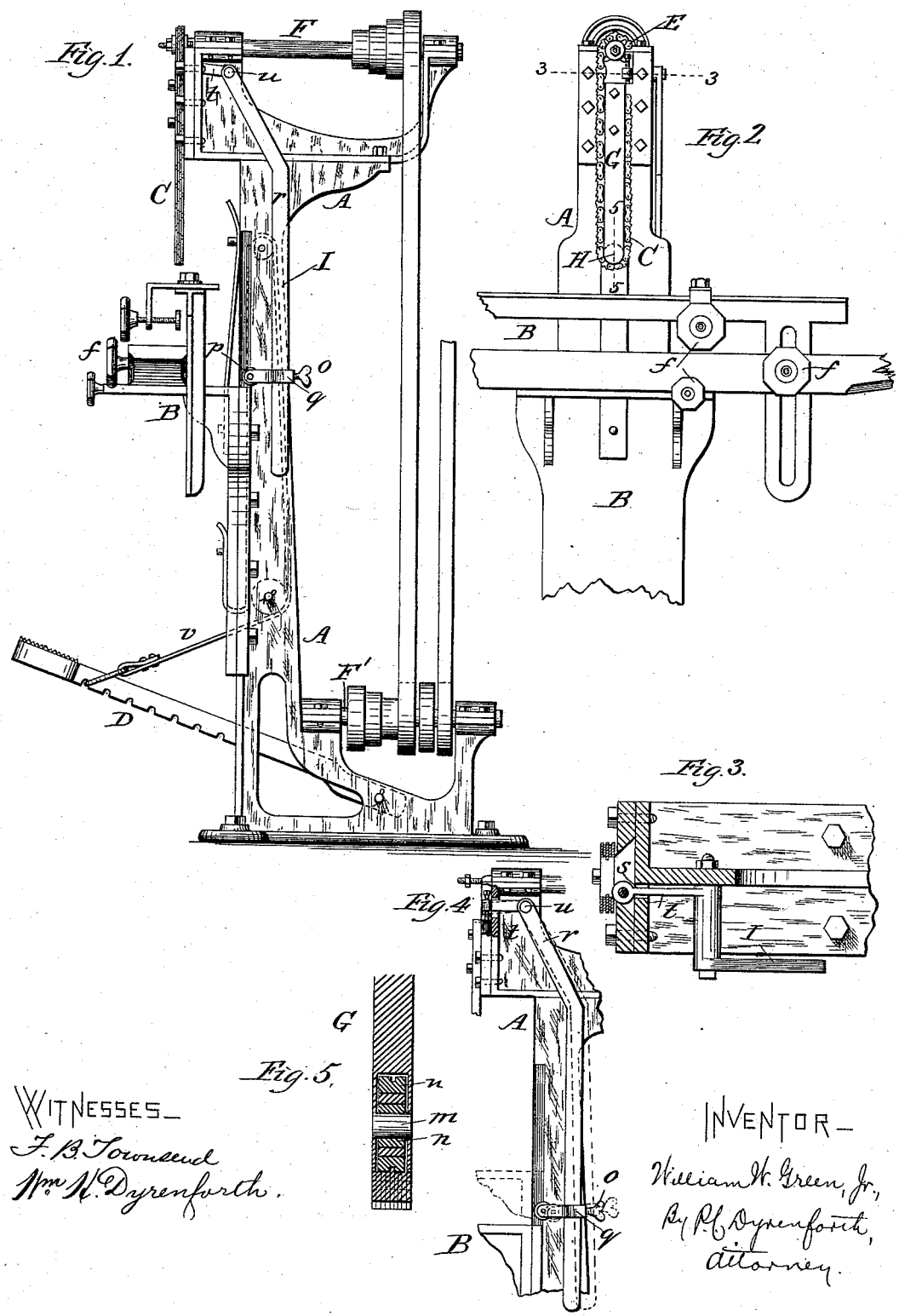

W. W. GREEN, Jr.
ENDLESS CHAIN MORTISING MACHINE.

No. 268,014. Patented Nov. 28, 1882.

WITNESSES—
F. B. Townsend
Wm. H. Dyrenforth

INVENTOR—
William W. Green, Jr.,
By P. C. Dyrenforth,
Attorney.

UNITED STATES PATENT OFFICE.

WILLIAM W. GREEN, JR., OF CHICAGO, ILLINOIS, ASSIGNOR, BY MESNE ASSIGNMENTS, TO THE AMERICAN CHAIN MORTISING MACHINE COMPANY.

ENDLESS-CHAIN MORTISING-MACHINE.

SPECIFICATION forming part of Letters Patent No. 268,014, dated November 28, 1882.

Application filed April 15, 1882. (No model.)

*To all whom it may concern:*

Be it known that I, WILLIAM W. GREEN, Jr., a citizen of the United States, residing at Chicago, in the county of Cook and State of Illinois, have invented certain new and useful Improvements in Endless-Chain Mortising-Machines; and I hereby declare the following to be a full, clear, and exact description thereof, reference being had to the accompanying drawings, of which—

Figure 6:
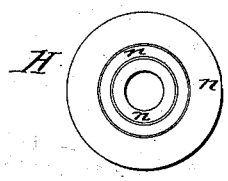
Figure 7:
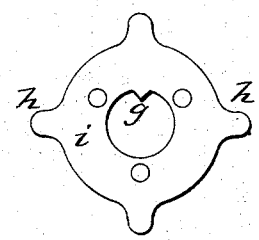
Figure 8:
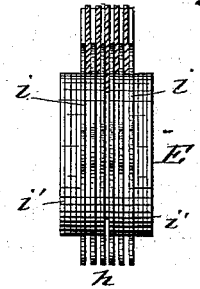
Figure 9:
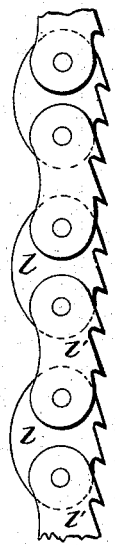
Figure 10:
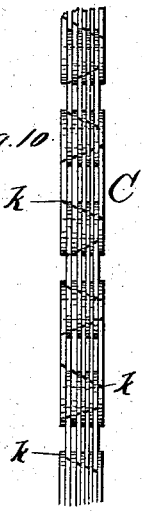

Figure 1 is a side elevation of a machine of the above-named character provided with my improvements; Fig. 2, a front elevation of the upper portion of the same; Fig. 3, an enlarged section taken on the line 3 3 of Fig. 2; Fig. 4, a detached portion of the machine as represented in Fig. 1, with certain portions in section to show the interior construction; Fig. 5, an enlarged vertical section taken on the line 5 5 of Fig. 2, and Figs. 6, 7, 8, 9, and 10 detail views.

My invention relates to machines in which an endless chain carrying saw-teeth is employed for the purpose of mortising; and my object is, first, to provide means operating automatically whereby the chain, when acting upon the substance to be mortised, is tightened, and when not so acting is slackened, thus reducing frictional wear, preventing unnecessary strain, and permitting the oil to distribute itself freely. This object I accomplish by means of mechanism operated by the table as it is raised and lowered, and acting in combination with certain features hereinafter designated, whereby the chain-saw is tightened and slackened automatically at the proper time.

My invention consists, also, in the particular constructions which I adopt as to the mechanism just referred to, and also the driver and other features, all as hereinafter more fully set forth.

In the drawings, A is the frame of the machine, and B the table upon which the object to be mortised is placed. This table slides vertically upon the frame, and is raised at will to bring the object in contact with the saw C by means of a treadle, D, from which a strap, *v*, extends up over a pulley and then down and connects with the table. Thus a downward pressure upon the treadle raises the table, and as soon as the pressure is relaxed the table descends by its own gravity. The chain-saw passes around a driver, E, upon the end of a revolving shaft, F, at the head of the machine. This driver gives motion to the chain, and will be more particularly described hereinafter. The chain also passes around an elongated plate, G, below the driver E, terminating in a pulley, H. This pulley also will receive fuller description further on. The plate G, with its pulley H, has a vertical sliding movement within certain limits. It is thus obvious that by pressing the plate G downward the chain-saw is tightened, and that by raising it the chain-saw is slackened. The problem is to cause the chain to tighten when the table rises and slacken when the table descends, both automatically, and this I accomplish in the following manner:

I is a bell-crank lever having its fulcrum at *u*. Its short arm *t* passes horizontally through a slot, *s*, in the frame, and is connected to the upper end of the plate G. The long arm *r* of the lever hangs freely, and is provided with a short bar, *q*, projecting from it at right angles, and terminating in a roller, *p*. The bar *q* fits around the arm *r* of the lever and slides thereon, and may be adjusted to the required position by means of a set-screw, *o*. The proper position for it is a little above the point to which the adjacent or rear portion of the table descends, and it is of such length that about one-half of the roller *p* projects over that portion of the table when the two are out of contact. Hence when pressure is exerted upon the treadle the table, in rising, comes into contact with the roller and throws the lever I into the position represented by the dotted lines in Fig. 4, in which position it continues until the table is lowered again. This tilting of the bell-crank lever obviously forces down the plate G, thus tightening the chain, and as soon as the table descends below the roller *p* the lever resumes its normal position, thus lifting the plate G, and the chain slackened.

The pulley H is formed of a series of concentric loose rings, *n*, turning loosely on an axial shaft, *m*, in bearings formed at the lower end of the plate G. The construction is clearly shown in Figs 5 and 6 of the drawings. Each blade of the chain-saw is formed of links $l$ and $l'$, and a series of such blades, secured together by the same pins that connect the links, produce the chain-saw represented in Fig. 10. Different dies are used in forming the links for the several blades, whereby when the latter are put together the teeth occupy the diagonal and zigzag position represented by the line $k$ in Fig. 10.

As before stated, the chain-saw is propelled by the driver E upon the shaft F. This driver is formed of a series of annular plates, $i$ and $i'$, stamped out of sheet-steel or any other kind of metal, and bolted together. The plates $i$ are formed with projections $h$, and are inserted at the central portion of the driver, alternately with the plates $i'$, (which are made without projections,) in sufficient number to engage all the blades of the chain-saw as the driver revolves, the projections $h$ catching in the interstices between the links.

The internal projections, $g$, which are formed in the plates $i'$, as well as in the plates $i$, fit into a corresponding groove in the shaft F, and prevent the carrier from revolving independently.

The table may be adjusted to the desired position or angle by means of set-screws $f$, and the shaft E may be rotated from the shaft F by means of pulleys and belts, as shown in Fig. 1.

What I claim as new, and desire to secure by Letters Patent, is—

1. In a mortising-machine, the combination, with the endless-chain saw C, mechanism for driving the same, table for supporting the object to be mortised, and mechanism for raising and lowering the table at will, of the plate G, terminating in a pulley at its lower end and fitting within the confines of the chain-saws, and mechanism, substantially as described, automatically operated by the movement of the table, for depressing the plate G as the table is raised and elevating it as the table is lowered, as and for the purpose set forth.

2. In a mortising-machine, the combination, with the endless-chain saw C, mechanism for driving the same, table B for supporting the object to be mortised, and mechanism for raising and lowering the table at will, of the plate G, terminating in a pulley at its lower end and fitting within the confines of the chain-saw, and the bell-crank lever I, fulcrumed to the frame of the machine, and having its short arm connected to the plate G and its long arm hanging freely, and provided with a projecting bar, $q$, terminating in a roller, $r$, which extends for a short distance over the table when the latter is at its lowest point, substantially as described.

3. In combination with the endless-chain saw, driving-shaft, and frame of a mortising-machine, and with the plate and pulley around which the saw moves, the driver E upon the revolving shaft F, formed of annular plates $i$ and $i'$, secured together, the plates $i$ alternating with the plates $i'$, and being provided with projections $h$, adapted to enter the interstices between the links of the chain-saw, substantially as described.

4. In combination with the frame, endless-chain saw, and driving mechanism of a mortising-machine, and with the plate G, around which the saw moves, the anti-friction pulley or sheave H, formed of a series of loose concentric rings upon a common axis, substantially as described.

WILLIAM W. GREEN, JR.

In presence of—
EDWIN J. DIX,
R. S. ELDER.